United States Patent
Wellendorf

[15] 3,643,742
[45] Feb. 22, 1972

[54] FOLDUP IMPLEMENT

[72] Inventor: Erwin W. Wellendorf, Ortonville, Minn. 56278

[22] Filed: Jan. 2, 1969

[21] Appl. No.: 788,500

[52] U.S. Cl. .............................. 172/316, 172/456, 172/488
[51] Int. Cl. ...................................................... A01b 63/22
[58] Field of Search ................. 172/315, 311, 456, 126, 488, 172/458, 310, 452, 423, 776; 280/476.1, 411.1

[56] References Cited

UNITED STATES PATENTS

| 2,620,200 | 12/1952 | Anderson | 280/411 X |
|---|---|---|---|
| 2,750,724 | 6/1956 | Stephenson | 172/488 X |
| 2,944,615 | 7/1960 | Clark | 280/411 X |
| 3,072,200 | 1/1963 | Yerkes | 172/126 |
| 3,173,497 | 3/1965 | French | 172/456 |
| 3,477,518 | 11/1969 | Walker et al. | 172/311 |

Primary Examiner—Robert E. Pulfrey
Assistant Examiner—Stephen C. Pellegrino
Attorney—Stanley G. Delahunt

[57] ABSTRACT

A foldable multiple section farm implement having a central wheeled cart, laterally extending folding units for supporting harrow sections, a rearwardly extending tail unit also for supporting harrow sections, and a single lift means for raising and lowering the lateral and tail units from an extended operating position to a raised storage and travel position. The laterally extending sections comprise inner and outer wings. When the inner wing is lifted, a static cable causes the outer wing also to be elevated for a short distance (so that the outboard wheel does not drag on the ground), then to fold down about the hinged junction between the inner and outer wings as the inner wing is further raised. Upon lowering of the inner wing the outer wing unfolds to a fully extended position without substantial dragging on the ground. Preferably, the initial load on the lift means is reduced by employing a lost motion connection between it and the tail unit whereby the tail unit does not begin to raise until the lateral units have been raised a substantial distance.

4 Claims, 7 Drawing Figures

PATENTED FEB 22 1972

INVENTOR.
ERWIN F. WELLENDORF
BY
Stanley G. DeLa Hunt
ATTORNEY

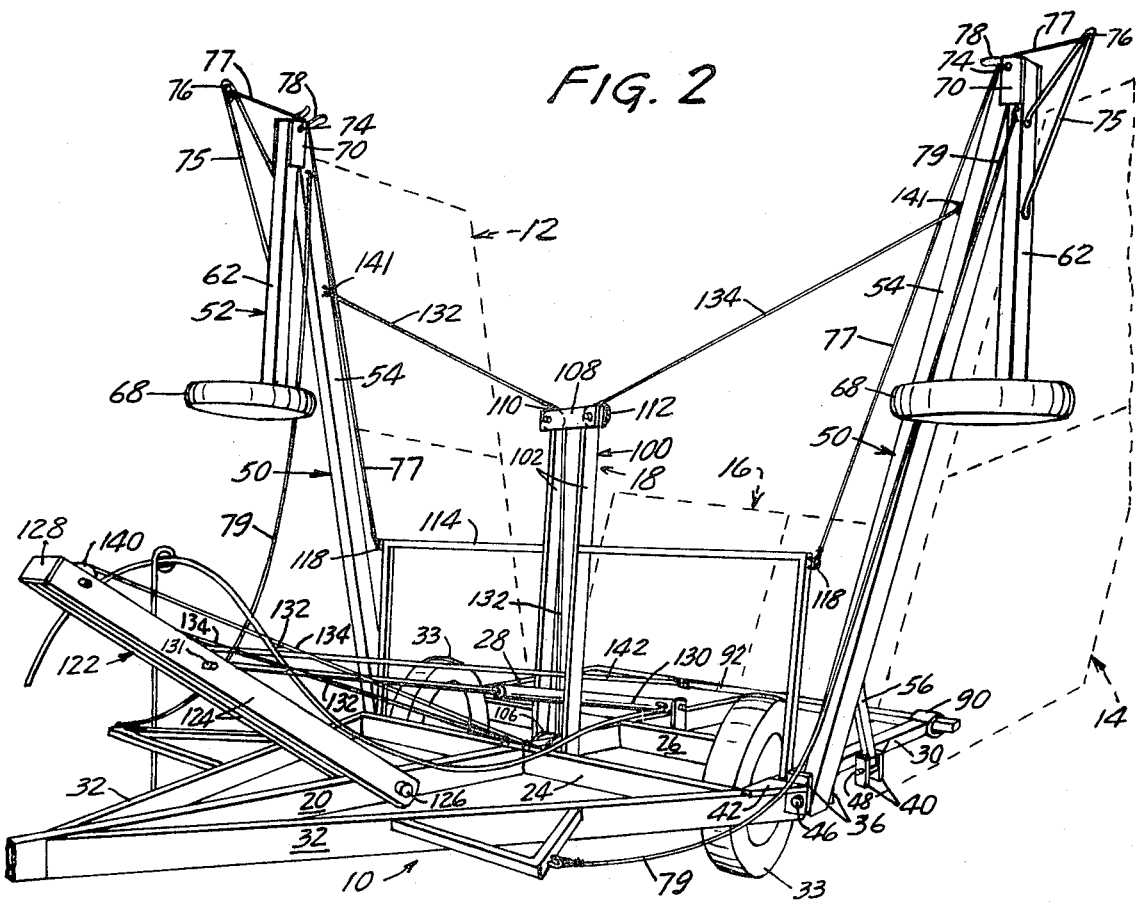
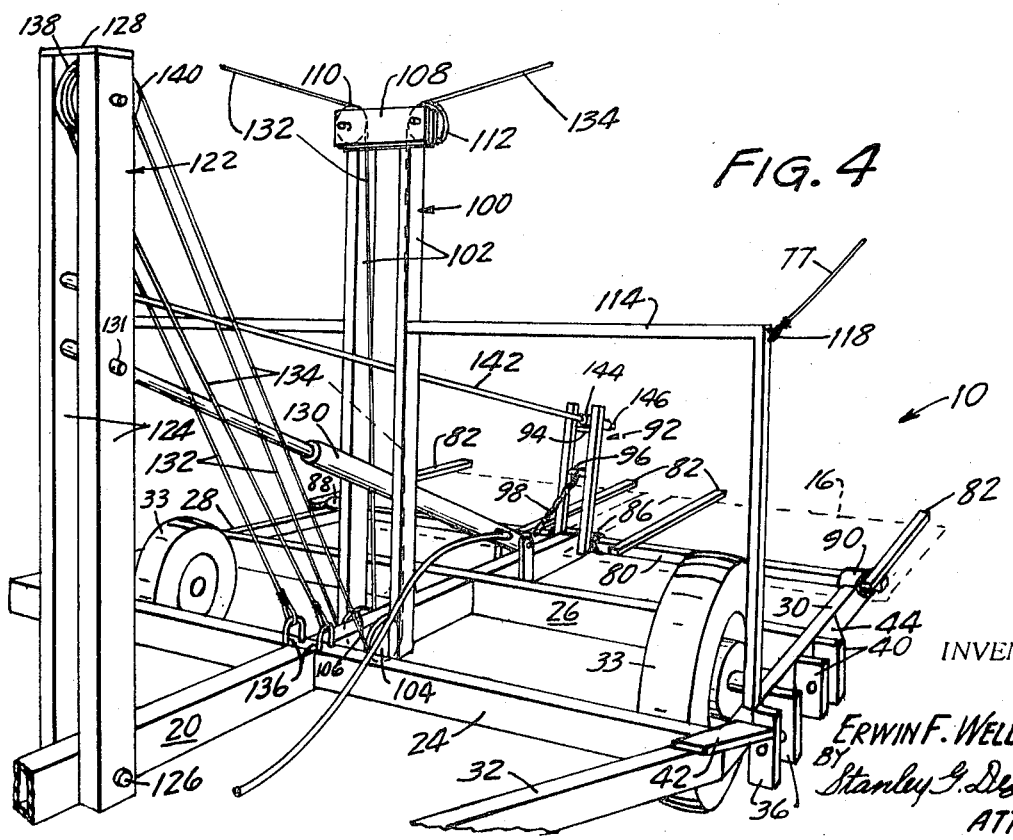

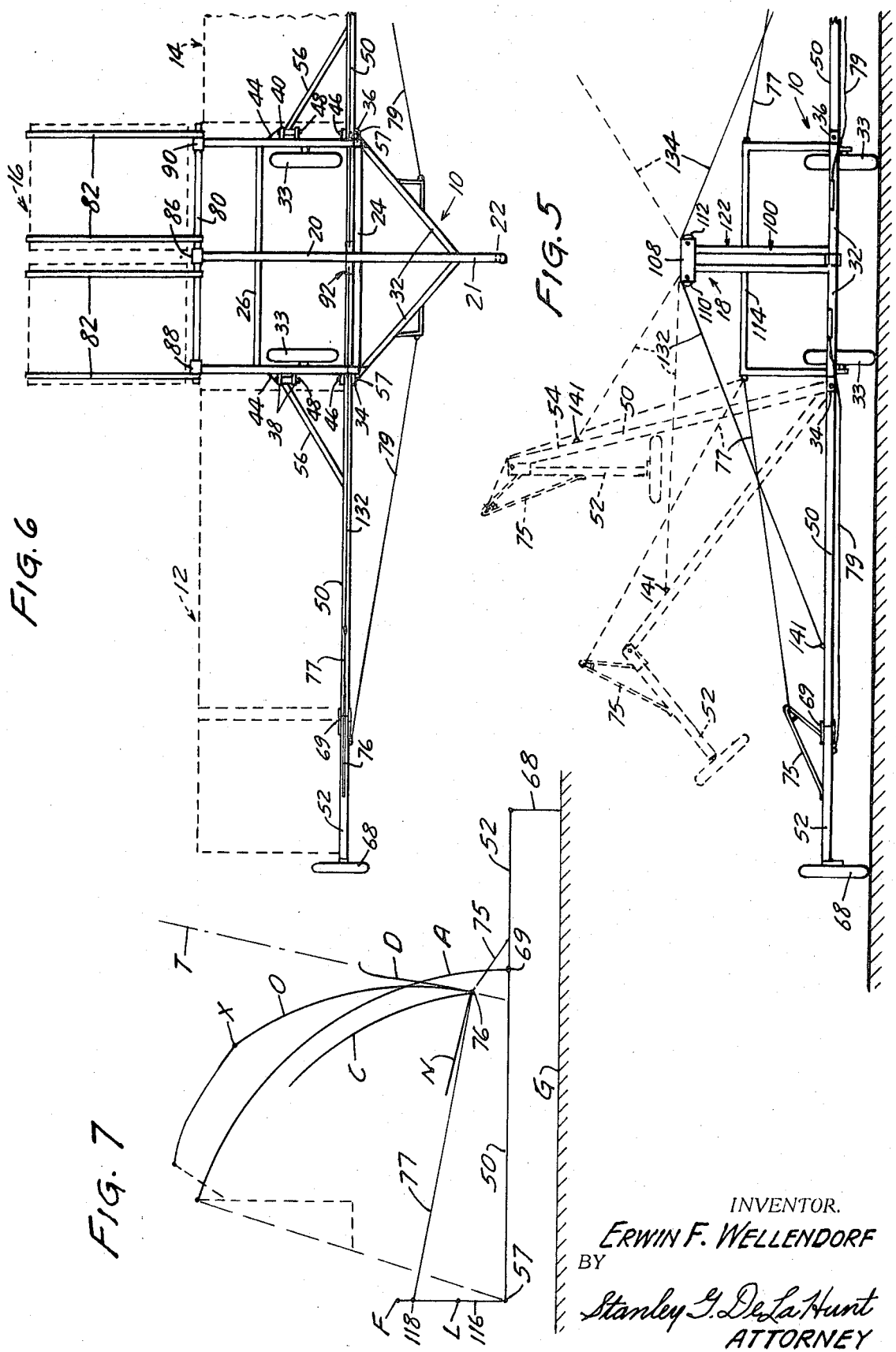

FOLDUP IMPLEMENT

The present invention relates to a novel multiple section farm implement such as a multiple drag harrow wherein the drag-supporting sections fold up into a compact unit for transportation.

In drag harrows wherein sections containing downwardly projecting spikes are dragged over the ground to level it out, break up clods, etc., the desirability of carrying a number of drag sections side by side on a trailer implement drawn by a tractor has been recognized, to the end that a maximum width could be covered during a single path over the field. Numerous prior art patents disclose various such implements, some also disclosing means for folding side harrow-supporting units into a more compact traveling position by means of cables and levers actuated by mechanical or hydraulic power takeoffs from the tractor drawing the implement. For example, as early as 1930 Anderson U.S. Pat. No. 1,742,678, granted Jan. 7, 1930, discloses a horse-drawn foldup harrow carried on a trailer in which multiple harrow units are raised and lowered as a unit from and into a ground engaging work position by actuation of a manual lever. When off the ground the harrow units can be collapsed by another manual winding device into a more compact storage unit. Garrett U.S. Pat. No. 2,599,251, granted June 3, 1952, discloses a tractor-drawn multiple harrow which utilizes a hydraulic powered mechanism for retracting and lowering wheels (whereby the harrow units are respectively lowered into ground engaging position, and raised into traveling position), and a separate rotary windup mechanism for folding up the lateral harrow units. More recently, Groenke U.S. Pat. No. 3,255,830, granted June 14, 1966, and Groenke U.S. Pat. No. 3,321,028, granted May 23, 1967, have been directed to tractor-drawn foldup cultivating apparatus each utilizing separate hydraulic systems, one to retract and lower the trailer wheels for traveling, and another to raise and lower lateral side wings. Adee U.S. Pat. No. 3,327,787, granted June 27, 1967, discloses a tractor-drawn disk harrow wherein hydraulic power is employed to raise and retract wheels for transporting the device, and a manual winch for raising foldup side sections.

It will be noted that in all of this prior art two separate systems are provided in the wheel-drawn implements, one to retract the trailer wheels for transportation of the implement, and another for raising or folding the lateral harrow supporting wing units. Also, where multiple folding units are employed on each side of the implement, positive lifting mechanism is necessary to raise and lower each folding section.

Insofar as I am aware, no one, prior to the present invention, has provided a relatively simple foldup implement wherein the active implements or units are raised from their operative ground engaging position to the folded up position in a single step, by a single lift means; and where static means can be utilized in the case of multiple side sections to minimize and simplify the dynamic lifting mechanism needed. The present invention provides such an improved farm implement, wherein the sections can be folded up or lowered on the move, without the operator ever needing to leave the tractor which is drawing the unit.

The manner in which these and other objects and advantages are realized in the present invention will be apparent from the description which follows, taken in conjunction with the accompanying drawing, wherein like reference characters denote corresponding parts in the several views, and in which FIG. 1 is a view in perspective of a preferred embodiment of the present invention, in the folded up traveling and storage position;

FIG. 2 is a perspective view of the central cart of the device of FIG. 1 showing also essential aspects of the lateral drag-supporting units:

FIG. 4 is an enlarged perspective of a portion of the central cart of the device of FIG. 1 showing the main parts the lift mechanism in the position assumed when the harrow-supporting units are unfolded in operative position;

FIG. 5 is a front view of a portion of the device of FIG. 1 showing one of the lateral harrow-supporting units in full lines in the fully extended operative position, and in broken lines in both the fully raised and in an intermediate position;

FIG. 6 is a top view of a portion of the device of FIG. 1, showing primarily the central cart and tail unit; and FIG. 7 is a diagrammatic view illustrating the mechanism by which folding and unfolding of the wings occurs in my invention.

Figure 1:
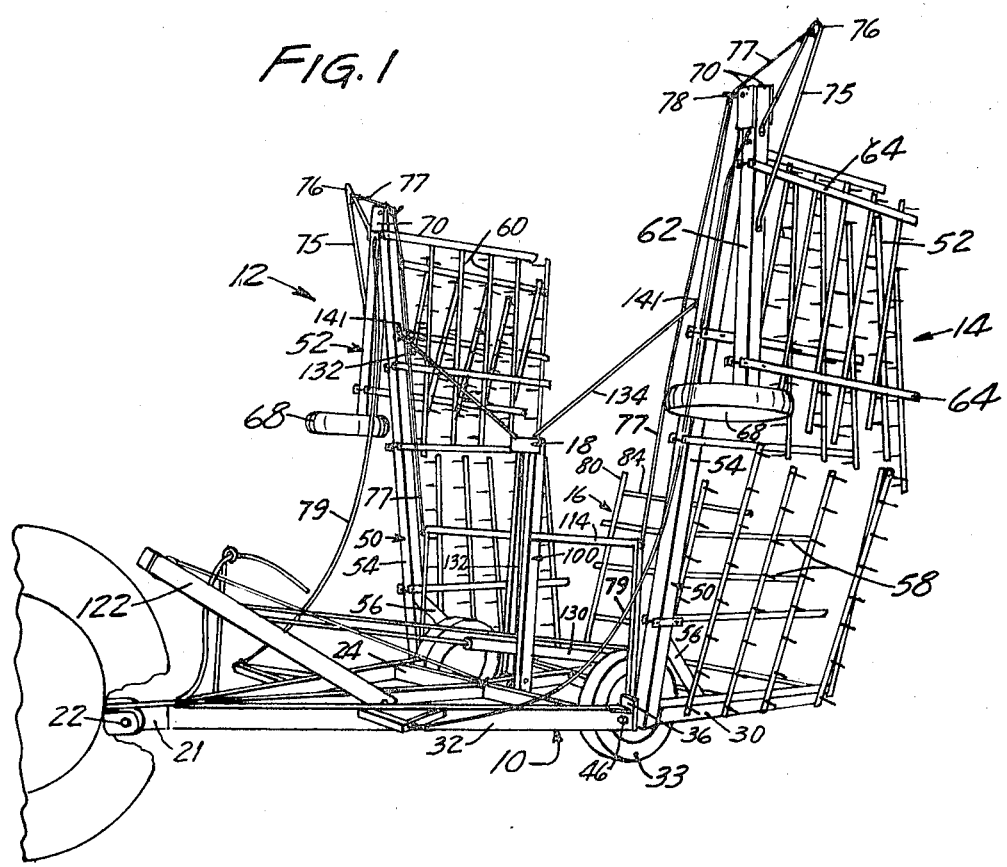

Referring now to the drawing, my device is seen to generally comprise a central cart 10, folding multiple drag-supporting units 12 and 14 extending laterally from each side of the cart 10, a tail drag supporting unit 16 extending rearwardly from the cart, and a lift mechanism 18 for operating the several drag-supporting units.

The frame of cart 10 is formed of a central drawbar 20 terminating at its forward end in a tongue 21 and a hitch 22 for releasably connecting to a tractor or other mobile power source. Extending laterally from the drawbar 20 are front and rear crossbars 24 and 26, to the ends of which are side support bars 28 and 30, positioned parallel to and extending the same distance rearward of crossbar 26 as drawbar 20. Braces 32 extend angularly from the respective junctions of front crossbar 24 and the forward ends side bars 28 to a forward point on drawbar 20. The frame, as just described, is preferably formed of steel tubing of rectangular cross section, joints being welded.

On the inside of the cart frame, wheels 33 are mounted between the front and rear crossbars 24 and 26. The wheel axles (not shown) are affixed to the side support bars 28 and 30.

Fastened to the outer surfaces of side support bars 24 and 26 are front and rear pairs of laterally extending parallel wing support plates 34 and 36, and 38 and 40 (FIG. 5). The forward pairs 34 and 36 are fastened adjacent the junction of the respective side support bars and crossbar 24. The front plate of each pair 34 and 36 is braced with gusset 42. The rear pairs 38 and 40 of plates are positioned slightly forwardly of the junction of the side supports and rear crossbar 26. A gusset 44 braces the rear plate of each of pairs 38 and 40. Each of the plates is drilled to allow for insertion of mounting front and rear pins 46 and 48 by which the lateral drag-supporting units are attached to the cart 10.

The lateral drag-supporting units 12 and 14 are identical, each consisting of an inner wing 50 and an outer wing 52. The inner wing 50 comprises mainly an inboard support arm 54 and brace 56 fastened thereto and extending rearward and inward. At its inward end, arm 54 of each of units 12 and 14 is pivotally connected about pins 46 which extend through front wing support plates 34 and 36. Brace 56 of each wing is journaled about its pin 48 extending through plates 38 and 40, respectively. Thereby inner wings are free to pivot on the cart about said pins 46 and 48 on an inner pivot designated 57, between a generally horizontal and a raised position.

At spaced points along the support arm 54 are cantilevered rearwardly extending harrow support bars 58, these being removably fastened by means of tie bolts and plates. Two conventional harrow sections 60 are suspended from the support bars 58 by lengths of chain at various points, so that when the wings are in their extended operating position the harrow sections are suspended for dragging over the ground.

To the outer end of the inboard support arm 54 is pivotally connected outer wing 52 which comprises outboard support arm 62, and harrow support bars 64 cantilevered therefrom. A single harrow section 66 is slung beneath the bars 64, by means of chains, as before. An outboard wheel 68 is mounted at the free end of outboard arm 62 for supporting the wings in their extended position.

Figure 3:
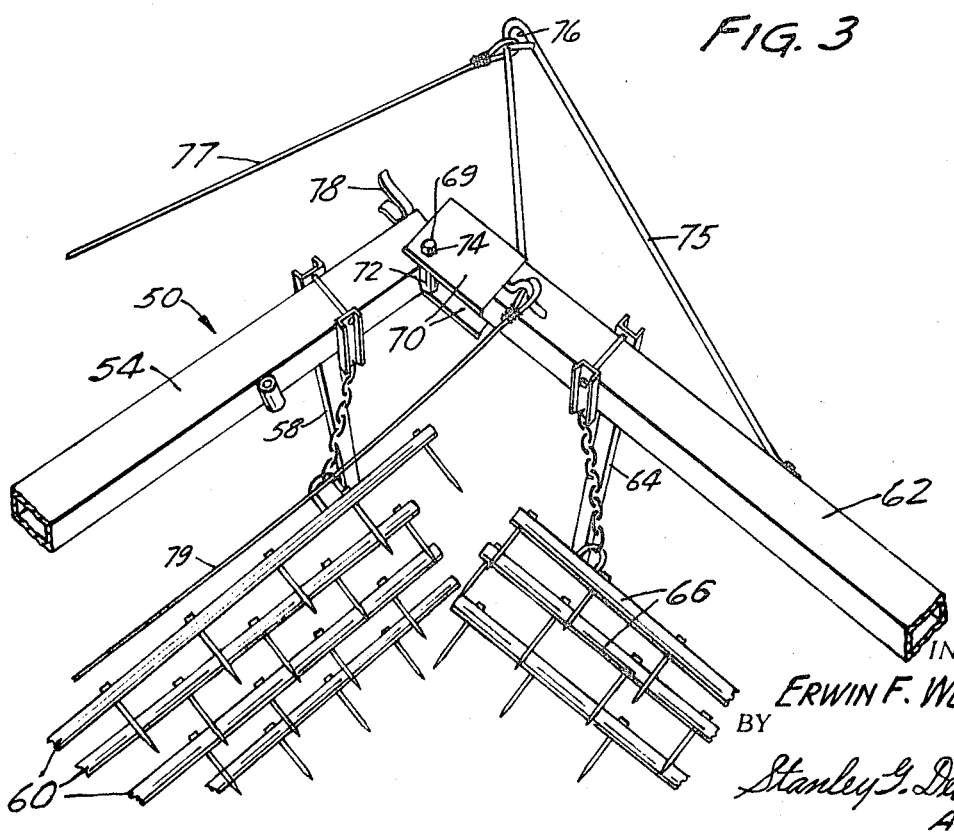
FIG. 3 shows in perspective the hinged position of the lateral harrow-supporting units of the device of FIG. 1 in partially unfolded position.

The pivotal junction 69 between inboard and outboard arms 54 and 62 is such as to prevent a collapse of the wings when in the extended operating position, at which time the wings are supported only at their extremities, at the inner end by cart 10 and at the outer end by outboard wheel 68. This is accomplished by opposed plates 70 (FIG. 3) welded on the front and rear surfaces of outboard arm 62, said plates extending for a distance inward from and below the arm. A bearing 72, e.g., a short piece of pipe, of a length just less than the distance between said plates is welded across the underside of inboard wing arm 54 adjacent the outer end thereof. The wings are then joined by pin 74 which passes through plates 70 and bearing 72 at a point with respect to the plates so that when the wings are extended the ends of inboard and outboard arms 54 and 62 abut. It will be seen that when this condition occurs—since pin 74 (i.e., point 69) is disposed below the arms—weight carried by the arms simply causes the abutting ends to press against one another, forming a rigid joint which will not collapse.

A generally V-shaped cable bracket 75 having an enclosed eye 76 at its apex is fastened to the outboard arm 62 on the upper side thereof with the apex situated generally above and slightly inward of the pivot point between arms 54 and 62 when the wings are extended. A static tension cable 77, forming part of lift mechanism 18, is fastened at its outboard end to the eye 76. A cable guide 78 is formed of two ears extending upwardly from inboard arm 54 near the junction 69, for receiving cable 77, as hereinafter described.

A chain or cable 79 extends diagonally outwardly and rearwardly from each of braces 32 to the respective outer wings 52 to relieve stress on the pivot assemblies due to drag on the wings as the device is drawn over the ground during use. In the folded up position the cable 79 merely hangs slack (FIG. 2).

As shown most clearly in FIG. 6, to the rear of cart 10 is positioned the tail drag unit 16 comprising forward support bar 80 to which are mounted cantilevered harrow support bars 82. From these two conventional harrow sections 84 are hung by chain, as in the case of the lateral drag units 12 and 14. Forward support bar 80 of the tail unit is pivotally affixed at three points to the central cart 10, namely at its midpoint and at each end where the bar passes through bearings 86, 88 and 90 (which may be short pieces of pipe) welded to the rear extremities of drawbar 20 and side bars 28 and 30, respectively. On each side of bearing 86 two upstanding channel members forming pivot lever 92 are rigidly fixed to support bar 80 (FIG. 4). The channels are rigidly held in their spaced relation by upper spacer plate 94 and lower spacer plate 96, situated at the top and about the midpoint thereof, respectively. It will be noted that the tail drag unit can be pivoted between a generally horizontal position and a raised position by rotating pivot lever 92 about bearings 86, 88 and 90. A tension chain 98 fastened at one end to the lower spacer plate 96 on lever 92 and at its other end to draw bar 20 prevents the tail unit from dropping below the desired horizontal operating position.

The lift mechanism of my device is mainly contained in central cart 10, as shown in FIG. 4. A cable tower 100 is formed from two upstanding members 102 held in desired spaced relation at the bottom by a spacer member (not shown) welded to the underside of drawbar 20 slightly to the rear but spaced from the junction between the latter and crossbar 24. The members are seen to be spaced laterally from draw bar 20 so as to allow space for single pulleys 104 and 106 disposed on each side of the drawbar between it and the respective members 102 at the base of the tower 100. Plates 108 span the upstanding members at the top thereof to rigidify the tower structure, said plates jutting laterally of the members so as to provide a mount rearward of the plates for single pulleys 110 and 112. Said pulleys 110 and 112, disposed on axes extending front-to-rear, are positioned generally above pulleys 104 and 106 which are positioned on a laterally extending axis.

Connecting respectively with side supports 28 and 30 are a pair of right-angle frames 114, these being fastened at their inward ends to members 102 slightly above the midpoint thereof. Eye-members 118 positioned adjacent the outer corners of said frames (at a height to be discussed below) form the inboard connection for static tension cables 77, the outboard ends of which are fastened to the respective eyes 76 of cable brackets 75 of outer wings 52. For reasons to appear the length of cable 77 is such that it is taut or just slightly slack when the wings are extended in their horizontal operating position.

Pivotally mounted on drawbar 20 of cart 10 is cable boom 122, formed of two spaced elongate members 124 fastened at their lower ends alongside drawbar 20 on an axle 126. The boom is rigidified with elongate members 124 held in appropriate spaced relation by spacer 128 located at the free end of the elongate members.

To the rear of crossmember 26 a hydraulic cylinder-piston assembly 130 is pivotally mounted at one end on drawbar 20. At its other end the piston rod of assembly 130 passes between the upstanding members forming cable tower 100 and pivotally connects at 131 to cable boom 122. Thus, upon appropriate supply of hydraulic fluid from a power source, e.g., the tractor, actuation of the cylinder-piston assembly 130 causes the boom 122 to move back and forth from a rearward approximately vertical position to a forward nearly horizontal position.

One main function of boom 122 is to operate lifting cables 132 and 134, which are fixed to drawbar 20 at a point 136 just forward of pulleys 104 and 106. From this point the cables extend respectively up and around traveling pulleys 138 and 140, positioned on boom 122 adjacent the free end thereof, down and about pulleys 104 and 106 at the base of tower 100, then up and about pulleys 110 and 112 at the top of said tower (FIGS. 2 and 4). From this point the cables are respectively attached at 141 to inboard arms 54 of the respective inner wings 50.

It will be seen that upon movement of the cable boom 122 forward from its rearward position (in response to actuation of the hydraulic cylinder-piston assembly 130), the distance increases between traveling pulleys 138 and 140 and the cable anchor point 136 (compare FIGS. 2 and 4). This causes a pull on the cables between the fixed tower pulleys 110 and 112 and the point 141 at which the cable fastens to inner wings 50, thereby raising the wings.

As explained more fully below, due to the function of the aforementioned static tension cables 44, the outer wings 52 of the lateral drag-supporting units 12 and 14 are caused to raise initially at the same time the inner wings 50 are raised in response to pull on the movable cables 132 and 134. Then, as the inner wing 50 approaches the upright position, static cable 77 slackens and the outer wing "folds up" and dangles. In lowering, the reverse occurs. That is, as the inner wing 50 drops, tension is applied to cable—causing outer wing 52 to unfold. As the inner wing approaches a fully extended condition the outer wing also extends straight out.

It will be seen that quite a heavy load is exerted on the lift mechanism 18 during the initial stages in raising the lateral drag-supporting units 12 and 14. Then, as the wings approach the fully raised position, the load lessens. Conversely, the load increases as the lateral sections are lowered, reaching its maximum just before the section is set on the ground. In view of this the lifting of the tail unit 16 is preferably delayed in my device, until the lateral units are nearly fully raised. And, in lowering, its tail section is dropped first. This tends to balance the load on the lifting mechanism. Thus, the tail unit 16 is lifted by a tie rod 142 pivotally connected at its forward end to cable boom 122 at a point outward of the connection with the piston rod of assembly 130. At its rearward end tie rod 142 is connected by a "lost motion" arrangement to the upper (free) end of pivot lever 92 of the tail unit 16. In this assembly the tie rod 142 passes slidably through a cylindrical member 144 which is pivotally fastened to the upper spacer plate 94. The tie rod extends rearwardly of lever 92 for some distance when boom 122 is in its rearward position (i.e., when all units are in the extended operative positions). At its free end tie rod 142 contains a stop 146, which may be a washer welded thereon, of a diameter greater than that of cylindrical member 144. As boom 122 moves forward (upon actuation of the cylinder-piston assembly 130) the tie rod 142 slides through the member 144, and does not initially pull lever 92 to raise the tail unit during the period in which the greatest load is exerted on the lift mechanism in the raising of the lateral units. However, as the stop 146 engages cylindrical member 144 due to continued forward travel of boom 122 and tie rod 142, the lever 92 is then pulled forward thereby causing the tail unit to raise. It will be seen that when the drag-supporting units are lowered, the tail unit will immediately start to drop due to its own weight and will be fully lowered before the greatest load is applied by the weight of the lateral units during the final stages of their lowering.

My novel drag unit can be operated entirely from the tractor. Merely by actuation of the hydraulic fluid supply from the tractor the several drag-supporting units can be raised or lowered, even on the move. My device can thus be passed from one field to another through narrow gates without stopping or dismounting from the tractor.

The aforementioned static cable 77 is important. Without it, as the inner wing 50 was lifted, the outer wing 52, specifically wheel 68, would drag on the ground laterally inwardly. In addition to possibly damaging the device, a great load would be applied to the lift mechanism, especially if some rut or other obstruction were encountered as the wheel is dragged.

The static cable 77 and related components function as follows (special reference being directed to FIG. 5): As inner wing 50 is raised about its pivot 57, a fold instantaneously tends to occur at junction 69 of the inner and outer wings, due to the tendency of wheel 68 to remain grounded when the said junction 69 rises. As this occurs the point 76 at which the cable 77 is affixed to bracket 76 tends to pivot away from the central cart 20 in an arc about junction 69. With any movement away from the cart the distance between said point 76 and the inboard point 118 of cable 77 tends to increase. Because of the constant length of cable 77, however (assuming it is taut when the wings are in the initial extended position), the distance between points 118 and 76 cannot increase. Neither, therefore, can the outer wing 52 fold about junction 69, and it is caused to rise about inner pivot 57 along with inner wing 50.

As the inner wing continues its rise, junction 69 between the inner and outer wings, of course, travels in a circular arc about inner pivot 57. This path, it will be seen, ever approaches the inner connection point 118 of cable 77. The outer connection point 76 of cable 77, however, travels in a different arc, namely an arc about said inner point 118, inasmuch as the weight of the outer wing (which always tends to fall about junction 69) keeps cable 77 taut and the distance constant. Therefore, the outer cable connection point 76 moves about junction 69 as the wings rise, causing the outer wing 52 to fold gradually. As the inner wing continues its rise to a more upward position, the cable guides 78, located at outer end of wing 50, intercept cable 77 (FIG. 2) causing it then to pass in a crooked path about the end of the inner wing 50 to its outer connection point 76. Where this path becomes shorter than the actual length of cable 77, the cable becomes slack, and the outer wing dangles free, below its junction 69, in a generally vertical position.

On unfolding of the wings from the traveling and storage position, the reverse movement occurs. Inner wing 50 gradually lowers with the outer wing hanging free until such time as cable 77, extending from inner point 118 about guides 78 to outer point 76, is drawn taut. Then, as the inner wing continues to lower, the outer point 76 is caused to rotate about junction 69, thus unfolding the outer wing. Initial unfolding must occur before the inner wing has lowered to the point where the outer wing, if still dangling free, would touch the ground. The outer wing continues to unfold as the inner wing lowers until it is substantially in the fully extended position just as wheel 68 touches the ground.

The proper position and length of cable 77 is very important to proper operation. Several variables are involved, such as the respective lengths of wings 50 and 52, the position of outer connection point 76 of cable 77 (in relation to wing junction 69), and the position of inner cable connection point 118. In the device described, the length of the inner wing is 11 feet 6 inches from pivot 57 to pivot 69; the length of the outer wing is 5 feet 8 inches to the tread center of tire 68; outer cable connection point 76 is 20¼ inches above and 13 inches inward of junction 69; and the inboard cable connection point 118 on frame 116 is 39 inches above inner wing pivot 57.

These variables and the manner in which the desired function of the static cable 77 can be achieved with elements of different dimension, are to be further appreciated from the diagrammatic representation in FIG. 7. In this view, where parts are scaled to the dimensions just given for the illustrative device herein described, horizontal solid line 50 represents the inner wing, joined at junction 69 by outer wing 52, the wings in their fully extended positions. Short vertical line 68 represents the outboard wheel resting upon the ground G. The line jutting from outer wing 52 and terminating in point 76 represents bracket 75 and outer cable connection point 76, and line 77 denotes the static cable. These elements are also shown by broken lines in the fully raised position. Line 116 represents the vertical portion of frame 116, with point 118 representing the inboard connection point of cable 77.

Arc A in FIG. 7 represents the circular arc followed by junction 69 about inner pivot 57. Arc C represents the hypothetical circular arc which would be traveled by point 76 (also about inner pivot 57) if the outer wing remained in rigidly extended position in line with the inner wing as the latter is pivoted. Arc D represents the alternative unrestrained path which would be traveled by point 76 as the inner wing 50 is raised, the outer wing (viz the tread of wheel 68) being allowed to drag inwardly along ground G. Where the length and position of cable 77 is so adjusted that the path of point 76 travels in a path intermediate arc C and arc D e.g., on arc 0, the actual path followed by point 76 in the illustrative device described), the outer wing will be caused to raise off of ground G without dragging, and then fold as inner wing 50 is raised.

The optimum condition is found by first locating points F and L on line 116, which represent the desirable limiting upper and lower points where the inboard end of cable 77 is to be fastened.

Point F is located as the point on line 116 which is intersected by a line N normal or perpendicular to the tangent T of arc D at its lowermost end. This represents the theoretical limiting upper position at which cable 77 can be attached at its inboard end and still cause lifting of outer wing 52 without substantial sidewise drag of the wheel. It will be seen that if cable 77 is fastened above point F, the arc struck by the outer end thereof, if maintained taut, would initially extend outside limiting arc D. Hence, as the inner wing is lifted, cable 77 would immediately slacken, and wheel 68 would drag.

Having located upper limit F, the lower limit L is next to be found. Note that if the cable is attached very low on frame 116 (e.g., at pivot point 57), point 76 is seen to travel coincident with arc C, and the outer wing is not allowed to unfold at all. This condition places an unnecessary workload on the lift mechanism, as well as making the device stand unduly tall in the traveling and storage position.

Of course, this condition can be tolerated, but I prefer to locate the lower limiting point L as the lowermost point where the inner end of cable 77 can be fastened while allowing the outer wing to dangle free in the fully raised position. On FIG. 7, point F is seen to be equidistant from point 76 when the outer wing 52 is in the extended position and when in fully raised position (cable 77 in the latter position extending about the end of inner wing 50 due to guide 77 shown on FIG. 3).

I have found it most desirable to fasten the cable between limiting points F and L, nearer to point F, as this allows the outer wing to dangle earlier during the raising of the wings, thus reducing the workload on the lift mechanism. But the cable preferably is fastened a few inches below point F, as this allows for some slack in cable 77 when the wings are extended into operative position while still raising the wheel 68 without substantial sidewise drag. This is desirable because, as a practical manner, even if the cable were initially taut, some slack would soon occur due to the inevitable strain exerted on the cable through use.

Point 118 represents a good workable inboard cable connection point for units of the dimensions described. Thus, the actual arc 0 traveled by point 76 in the device described lies in a path intermediate arcs C and D. Said arc 0 is circular about inner connection point 118 so long as cable 77 is taut and controls the attitude of outer wing 52. By the time point 76 reaches X on arc 0, however, the outer wing 52 has folded to the point where it dangles free from junction 69. During further upward travel the distance between points 118 and 76 becomes less than the length of cable 77, and the cable slackens. In the reverse movement, as the inner wing is lowered, outer wing 52 dangles free until point 76 reaches X on the downward arc traveled thereby. The cable then becomes taut, causing the outer wing to pivot about junction 69 and unfold. It assumes a fully extended position just as the assembly reaches the extreme position as it is grounded.

If it is desired to locate the instantaneous position of outer wing 52 at any time during raising or lowering, this can be done by first tracing the outer wing on separate tracing paper, making sure that points 69 and 76 are clearly marked. Of course, the junction point 69 of the inner wing must follow the circular arc A, the center of which is inner wing junction 57. By sliding the traced wing up and down, keeping point 69 on said arc A, while also keeping point 76 on arc 0, the position of the outer wing is determined at any point. It will be observed that this same procedure can be followed in determining the position of the outer wing, in the event other parts' dimensions or cable positions are being considered.

Hereinabove I have described my invention in connection with a preferred embodiment utilizing conventional tooth harrow units. It will be appreciated that other implements can be similarly suspended in place of the drag harrow, such as spade or disk harrows or other drag or rolling tool.

What I claim is as follows:

1. In an implement, a laterally extending unit connected to a frame at an inner pivot, said unit comprising hingedly joined inner and outer wings; lift means for raising and lowering said inner wing; and folding means for causing said outer wing initially to raise when said inner wing is elevated about the inner pivot by said lift means, to fold down about said hinge without dragging on the ground as the inner wing continues to rise, and to unfold without substantial dragging as the inner wing is lowered, said folding means including a static cable which is substantially taut when the wings are extended, affixed to the outer wing at an outboard connection point spaced from said hinge and at its inboard end to the frame at a point which is (a) below a line normal to the tangent of the unrestrained arc of said outboard connection point at its lowermost point as the inner wing is raised, and (b) above the inner wing pivot.

2. A foldable multiple sectional farm implement, comprising
   a. a central wheeled cart having forward extending hitch means for attachment to a mobile power means;
   b. a laterally extending unit suitable for suspendably supporting harrow sections joined to each side of said central cart at an inner pivot, said laterally extending units each comprising hingedly joined inner and outer harrow-supporting wings and folding about said inner pivot from a generally horizontal working position to an upward storage position;
   c. a rearwardly extending tail unit also suitable for suspendably supporting harrow sections pivotally joined to the rear of said cart, said tail unit folding from a generally horizontal working position to a raised storage position;
   d. hydraulically powered lift means for raising and lowering said lateral and tail units; and
   e. outer wing-folding means for causing said outer wing initially to raise when said inner wing is elevated about the inner pivot by said lift means, to fold down about said hinge without dragging on the ground as the inner wing continues to rise, and to unfold without substantial dragging as the inner wing is lowered; said folding means comprising a static cable which is substantially taut when the wings are extended, affixed to the outer wing at an outboard connection point spaced from the hinged junction of said inner and outer wings and at its inboard end to the cart at a point which is (i) below a line normal to the tangent of the unrestrained arc of said outboard connection point at its lowermost point as the inner wing is raised, and (ii) above the inner wing pivot.

3. The implement of claim 2 wherein said lift means comprises a hydraulically powered boom containing traveling pulleys, and lift cables passing about said traveling pulleys fixed at one end to the central cart and at the respective other ends to each of the laterally extending units, said boom also having a rearwardly extending tie rod connected thereto fastened at its rearward end to a lever on the tail unit, said boom upon movement thereof causing said lateral and tail units to rise from an extended work position.

4. A foldable multiple sectional farm implement, comprising
   a. a central wheeled cart having forward extending hitch means for attachment to a mobile power means;
   b. a laterally extending unit suitable for suspendably supporting harrow sections joined to each side of said central cart at an inner pivot, said lateral units folding about said inner pivot from a generally horizontal working position to an upward storage position;
   c. a rearwardly extending tail unit also suitable for suspendably supporting harrow sections pivotably joined to the rear of said cart, said tail unit having a lever thereon for folding said tail unit from a generally horizontal working position to a raised storage position; and
   d. hydraulically powered lift means for raising and lowering said lateral and tail units including a tie rod joined to the tail unit lever through a lost motion connection whereby the tail unit does not raise upon forward movement of the tie rod until after the lateral units have begun to raise.

* * * * *